US008239208B2

(12) United States Patent
Philippe et al.

(10) Patent No.: US 8,239,208 B2

(45) **Date of Patent: *Aug. 7, 2012**

(54) SPECTRAL ENHANCING METHOD AND DEVICE

(75) Inventors: Pierrick Philippe, Chevaigne (FR); Patrice Collen, Rennes (FR)

(73) Assignees: France Telecom SA, Paris (FR); Telediffusion de France SA, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,183

(22) Filed: Apr. 9, 2010

(65) Prior Publication Data

US 2010/0250264 A1 Sep. 30, 2010

Related U.S. Application Data

(62) Division of application No. 10/257,916, filed as application No. PCT/FR01/01126 on Apr. 12, 2001, now Pat. No. 7,742,927.

(30) Foreign Application Priority Data

Apr. 18, 2000 (FR) ..................................... 00 05023

(51) Int. Cl.

*G06F 15/00* (2006.01)
*G10L 11/00* (2006.01)
*G10L 19/00* (2006.01)

(52) U.S. Cl. ..................... 704/501; 704/200; 704/200.1; 704/500

(58) Field of Classification Search .................. 704/200, 704/200.1, 500, 501

See application file for complete search history.

(56) References Cited

U.S. PATENT DOCUMENTS

| | | | |
|---|---|---|---|
| 3,667,047 | A | 5/1972 | Iwasaki et al. |
| 4,776,014 | A | 10/1988 | Zinser, Jr. |
| 5,068,899 | A | 11/1991 | Ellis et al. |
| 5,069,899 | A | 12/1991 | Whitbourne et al. |
| 5,127,054 | A | 6/1992 | Hong et al. |
| 5,226,083 | A | 7/1993 | Taguchi |

(Continued)

FOREIGN PATENT DOCUMENTS

| | | |
|---|---|---|
| EP | 0994464 | 4/2000 |

(Continued)

OTHER PUBLICATIONS

"Predictive and residual encoding of speech", J. Makhoul and Michael Berouti, J. Acoust Soc. Am.66(6), Dec. 1979, pp. 1633 to 1641.

(Continued)

*Primary Examiner* — Eric Yen

(74) *Attorney, Agent, or Firm* — Young & Thompson

(57) ABSTRACT

The invention concerns a method for spectral enhancement and a device therefor. The inventive method is a method for enhancing spectral content of a signal having an incomplete spectrum including a first spectral band, the method including the following steps: at least transposing the spectral content of the first band into a second spectral band not included in the spectrum to generate a transposed spectrum signal, with spectrum limited to the second spectral band; transforming the spectrum of the transposed spectrum signal to obtain an enhancing signal; combining the incomplete spectrum signal and the enhancing signal to produce a spectrum enhanced signal. The invention is characterized in that the spectral content is subjected to a whitening step.

21 Claims, 4 Drawing Sheets

U.S. PATENT DOCUMENTS

| | | | | | |
|---|---|---|---|---|---|
| 5,455,888 | A | | 10/1995 | Iyengar et al. | |
| 5,504,832 | A | | 4/1996 | Taguchi | |
| 5,579,434 | A | * | 11/1996 | Kudo et al. | 704/219 |
| 5,623,577 | A | | 4/1997 | Fielder | |
| 5,812,971 | A | | 9/1998 | Herre | |
| 5,842,160 | A | * | 11/1998 | Zinser | 704/229 |
| 5,915,235 | A | * | 6/1999 | DeJaco et al. | 704/234 |
| 6,253,172 | B1 | | 6/2001 | Ding et al. | |
| 6,484,140 | B1 | | 11/2002 | Matsumoto et al. | |
| 6,647,140 | B1 | | 11/2003 | Wang et al. | |
| 6,680,972 | B1 | * | 1/2004 | Liljeryd et al. | 375/240 |
| 6,889,182 | B2 | | 5/2005 | Gustafsson | |
| 6,895,375 | B2 | * | 5/2005 | Malah et al. | 704/219 |
| 7,003,451 | B2 | * | 2/2006 | Kjorling et al. | 704/206 |
| 7,058,571 | B2 | | 6/2006 | Tsushima et al. | |
| 7,069,212 | B2 | | 6/2006 | Tanaka et al. | |
| 7,181,402 | B2 | * | 2/2007 | Jax et al. | 704/500 |
| 7,318,035 | B2 | | 1/2008 | Andersen et al. | |
| 7,337,118 | B2 | | 2/2008 | Davidson et al. | |
| 7,379,866 | B2 | * | 5/2008 | Gao | 704/220 |
| 7,831,434 | B2 | * | 11/2010 | Mehrotra et al. | 704/500 |
| 8,015,368 | B2 | * | 9/2011 | Sharma et al. | 711/147 |
| 8,069,050 | B2 | * | 11/2011 | Thumpudi et al. | 704/500 |
| 8,086,451 | B2 | * | 12/2011 | Hetherington et al. | 704/225 |
| 2002/0087304 | A1 | * | 7/2002 | Kjorling et al. | 704/219 |
| 2002/0152084 | A1 | * | 10/2002 | Main | 704/500 |
| 2003/0050786 | A1 | * | 3/2003 | Jax et al. | 704/500 |
| 2003/0187663 | A1 | | 10/2003 | Truman et al. | |
| 2005/0065792 | A1 | * | 3/2005 | Gao | 704/233 |

FOREIGN PATENT DOCUMENTS

| | | | |
|---|---|---|---|
| JP | 8-123495 | | 5/1996 |
| WO | 98/57436 | | 12/1998 |
| WO | 00/45379 | | 8/2000 |
| WO | 01/26095 | A1 | 4/2001 |

OTHER PUBLICATIONS

Voice-Excited LPC Coders for 9.6 KBPS Speech Transmission, R Viswanathan et al. 1979, IEEE, C H 1379-7179/0000-0558.

Makhoul et al., "Predictive and residual encoding of speech," J. Acoust. Soc. Am., 66(6), Dec. 1979, pp. 1633-1641.

Leis J.W.; "A Class on Nonlinear Predictor Functions for the Speech Signal"; Aug. 25-30, 1996; 4Ch International Symposium on Signal Processing and Its Applications, pp. 567 to 570 vol. 2, XP00215S888.

D. Heidi; "Speech Enhancement for Bandlimited Speech"; May 12, 1998; IEEE, pp. 393 to 396, XPOO08S4598.

H. Yasukawa; "Spectrum Broadening of Telephone Band Signals Using Multirate Processing for Speech Quality Enhancement"; Aug. 1995; IEICE Transactions on Fundamentals of Electronics, Communications and Computer Science, pp. 996 to 998, XPOOO536056.

J. Schnitzler; "A 13.0 KBIT/S Wideband Speech Codec Based on SB-ACELP"; May 12, 1998; IEEE, pp. 157 to 160, XPOO08S4539.

Lawrence R. Rabiner, "Fundamentals of Digital Signal Processing", Bell Laboratories Incorporated, 1978, p. 10-23, Library of Congress Cataloging in Publication Data.

"Spectral Whitening in practice", version 1.0, http://www.xsgeo.com/course/spec.htm, Mar. 6, 2010.

Anssi Klapuri, "A Method for Visualizing the Pitch Content fo Polyphonic Music Signals", 10th International Society for Music Information Retrieval Conference (ISMIR 2009), p. 615-620.

* cited by examiner

SPECTRAL ENHANCING METHOD AND DEVICE

CROSS REFERENCE TO RELATED APPLICATIONS

This application is a division of co-pending application Ser. No. 10/257,916 filed on Feb. 21, 2003, which is the 35 U.S.C. §371 national stage of International PCT/FR01/01126 filed on Apr. 12, 2001, which claims priority to French Application No. 0005023 filed on Apr. 18, 2000. The entire contents of each of the above-identified applications are hereby incorporated by reference. Any disclaimer that may have occurred during prosecution of the above referenced applications is hereby expressly disclaimed.

FIELD OF THE INVENTION

The present invention relates to a method and to apparatus spectrally enhancing a signal having an incomplete spectrum. More specifically, the present invention is applicable to improved decoding an audio signal which was encoded by a limiting spectral frequency band encoder.

BACKGROUND OF THE INVENTION

As regards rate-reduction audio encoding, the audio signal often must undergo a bandpass limitation when the bit rate becomes low. This bandpass restriction is necessary to preclude introducing audible quantizing noise into the encoded signal. In such a case the high-frequency content of the original signal should be regenerated to the extent possible.

It is known from the state of the art, and in particular from the patent document WO 9,857,436 A, to regenerate the high-frequency special content of the original signal by harmonically transposing the low-frequency spectrum of the decoded signal toward the high frequencies. This transposition is carried out by recopying the spectral value of a fundamental fk at all frequencies of the harmonic series n*fk. The shape of the high-frequency spectrum so developed is adjusted by applying spectral weighting factors.

FIG. 1 schematically illustrates the spectral reconstruction apparatus of the state of the art. The encoded audio signal is decoded by a decoder 101 that applies a low-frequency spectrum signal $S_B$ to a bank 102 of analyzing filters, the outputs k of these filters being connected to the inputs of harmonic orders n*k (n=1 . . . N) of a set of synthesizing filters 104 after having been weighted by spectral weighting factors 103. For simplicity, the decimators at the output of the analyzing filter bank (respectively the interpolations of the synthesizing filter bench) were omitted.

The synthesized signal $S_H$ exhibits a high frequency spectrum. It is added to the signal $S_R$ by a summer 105 to generate a reconstructed wideband signal $S_R$.

The above cited reconstruction technique is based on a sub-band analysis and on a complex harmonic duplication. It entails computationally expensive methods for adjusting phase and amplitude. Moreover the spectral weighting factors only coarsely model the spectral envelope. In general and outside any decoding context, it is important that it be feasible to enhance the spectral content of a physical signal exhibiting an incomplete spectrum. The term "incomplete spectrum" denotes any spectrum with limited support or any spectrum exhibiting "holes". Such is the case in particular as regards an audio signal or a speech signal with limited bandpass: spectral enhancement then shall substantially improve sound quality and signal intelligibility.

SUMMARY OF THE INVENTION

The basic problem of the present invention is to create a spectral reconstruction apparatus and more generally a spectral enhancement apparatus of high performance and substantial simplicity.

A subsidiary problem based on one embodiment mode of the present invention is to attain a reconstructed special shape of this signal which shall be both more accurate and simpler than can be found in the state of the art.

The basic problem of the present invention is resolved by the claimed method of claim 1 and by the apparatus claimed in claim 20.

The above cited features of the present invention as well as further ones are elucidated in the following description of an illustrative embodiment mode and in relation to the attached drawings.

DETAILED DESCRIPTION OF THE DRAWING

Again the case of spectrally enhancing a signal $S_B$ having an incomplete spectrum and in particular a signal of restricted frequency band shall now be considered.

The present invention avails itself of the fact that assuming certain stationary modes, a signal may be modeled as being the result of filtering an excitation signal using a spectral envelope filter. If there is a description of the spectral envelope of the signal $S_B$, then its spectrum may be whitened by passing the signal through a whitening filter of which the transfer function is approximately inverse to the envelope function. In this manner the initial excitation signal is approximately produced less the effect of the spectral shape in the frequency band under consideration. Accordingly in the particular case of a speech signal, the excitation signal shall be rid of its formantic structure. The invention proposes to enhance the spectrum of the signal $S_B$ by transposing the whitened spectrum. The resulting signal is a transposed-spectrum signal which must be shaped. This spectral shaping is implemented by a shaping filter of which the transfer function illustratively is extrapolated from the spectral envelope function of the signal $S_B$.

Figure 1:
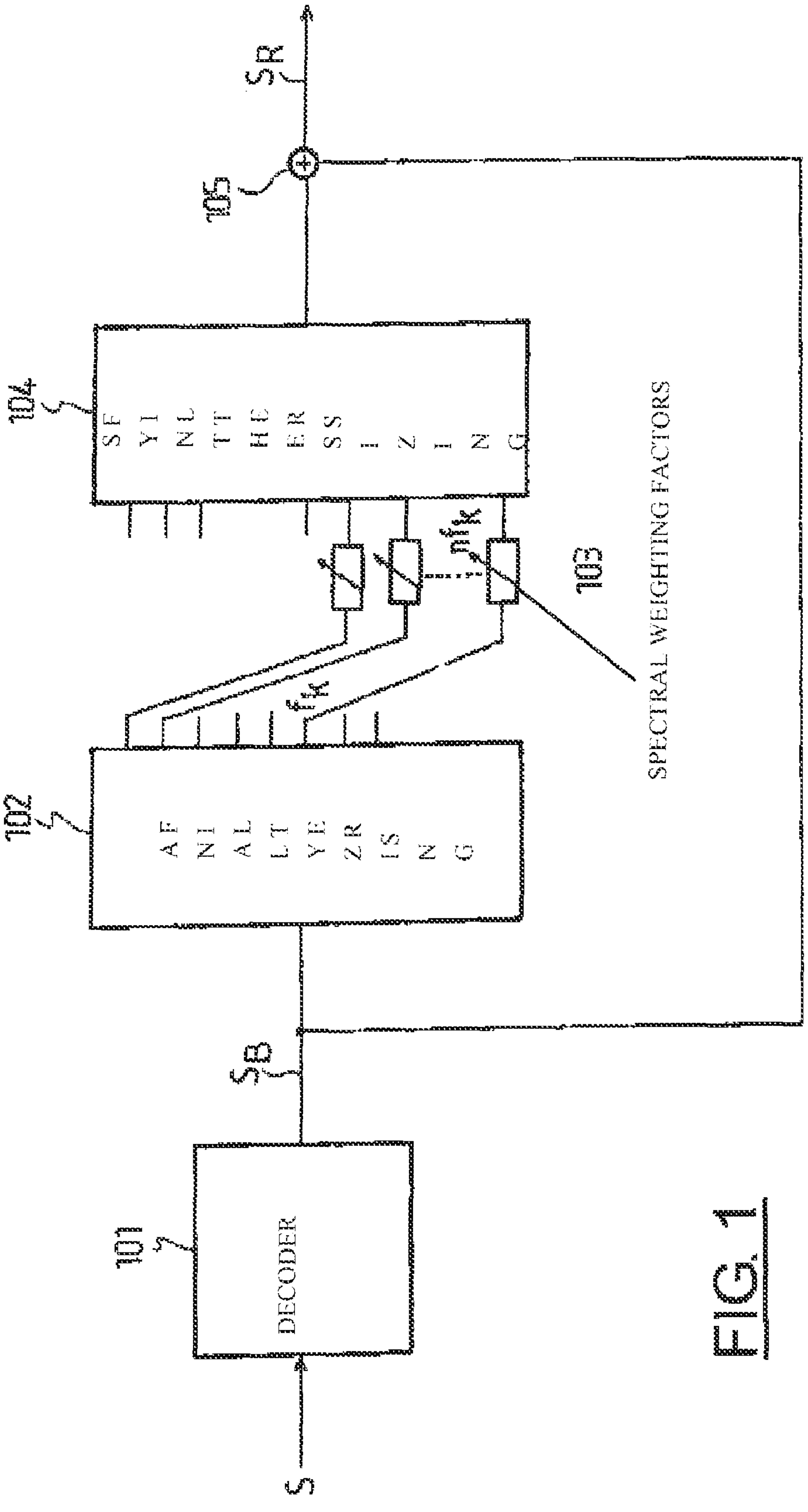
FIG. 1 is a schematic block diagram of a spectral reconstruction apparatus for an audio signal, of the state of the art.
Figure 2:
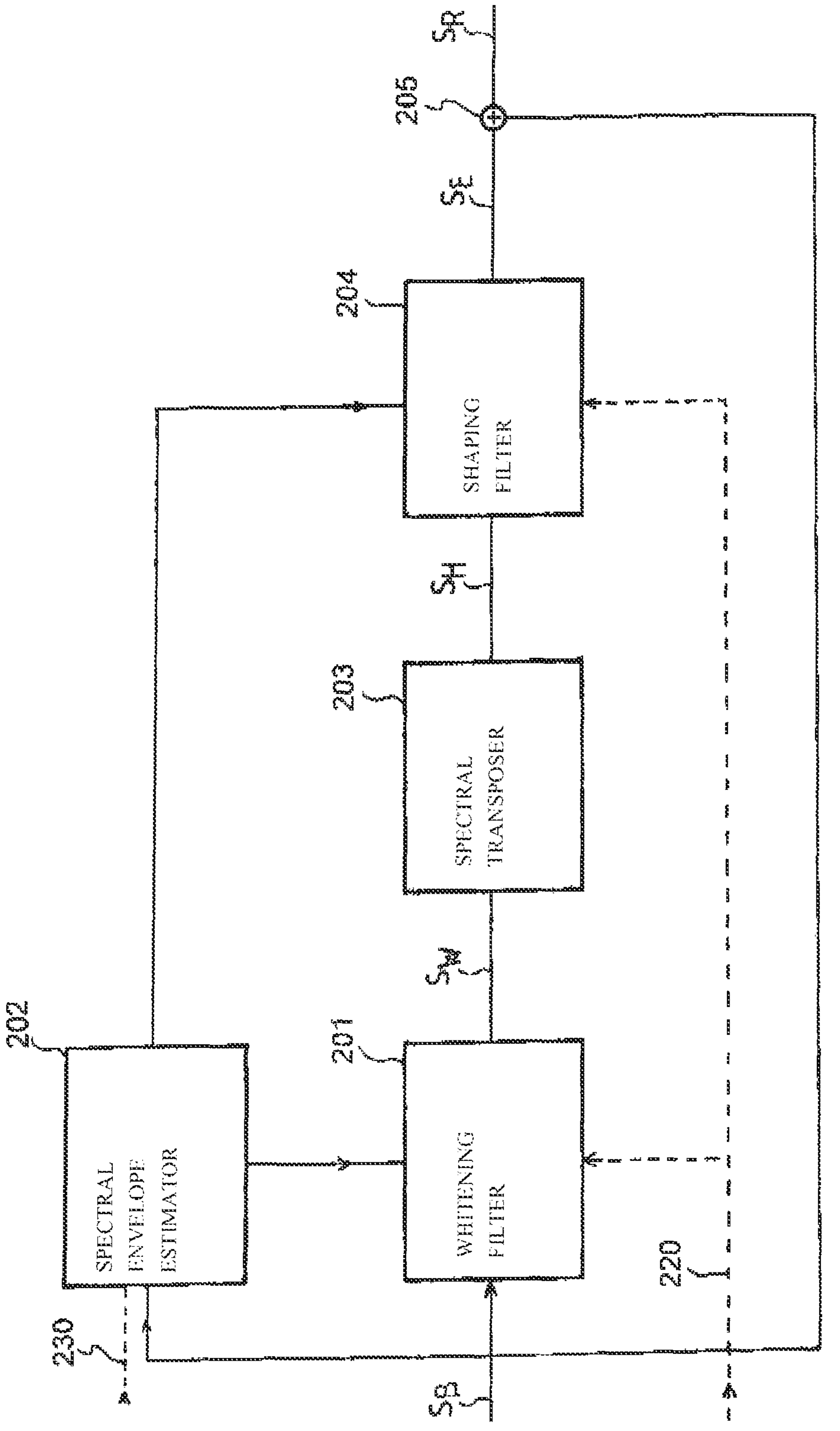
FIG. 2 is a schematic block diagram of a spectral enrichment apparatus of one embodiment of the present invention, FIG. *3a*, *3b* are block diagrams of spectral transposition modules for use in the apparatus of FIG. 2, FIG. 4 includes illustrations of the spectral enrichment method of an implementing mode of the invention.

FIG. 2 shows a spectral enhancement apparatus of the invention. The incomplete spectrum signal, which typically is a limited frequency band audio signal (for instance the band is 0-5 kHz) is filtered by a whitening filter 201 of which the transfer function is based on an estimate of the spectral envelope. The spectral envelope estimation is carried out by a module 202 of the enhancement apparatus. In a first embodiment mode of the invention, the spectral envelope estimate is based on analyzing the incomplete spectrum signal. In a second embodiment mode of the invention, the envelope is estimated on the basis of information and available from an external source, for instance a decoder. In both cases the transfer function of the whitening filter is the inverse of the spectral envelope function.

The whitened spectrum signal $S_W$ is subjected to spectral transposition by a transposing module 203. The shifted spectrum signal so attained, which typically is a signal having a spectrum translated toward the high frequencies (5-10 kHz for instance in the case of the above audio signal) next is filtered by a shaping filter 204. In a first embodiment mode, its transfer function is extrapolated from the spectral envelope function of the signal $S_B$. According to a second embodiment, the transfer function estimate is based on external information describing the spectral envelope of a full frequency band $S_B$. The filters signal $S_E$ which shall be termed the special enhancement signal, is added to the limited spectrum signal $S_B$ by a summer 205 to generate a spectrally enhanced (or reconstructed) signal $S_R$.

The spectral envelope estimating module 202 for example may model the envelope by an LPC analysis such as is described in the article by J. Makhoul, "Linear Prediction: A Tutorial Review" Proceedings of the IEEE, vol. 63, #4, pp 561-580. The signal S is modeled according to an autoregressive model of order P:

$$S_n = -\sum_{k=1}^{P} a_k s_{n-k} + Gu_n$$

where $s_n$ is the signal to be modeled, $a_k$ are the prediction coefficients (or LPC coefficients), $u_a$ is the prediction residue and P is the order of the filter used, that is the number of coefficients of the LPC filter used. G is a normalization gain. This LPC filter models the signal S in the form $$S(z) = G/A(z), \text{ where}$$

$$A(z) = \sum_{i=0}^{P} a_i z^{-t};\ a_0 = 1.$$

By suitably selecting the order P of the filter (p sufficiently high) and the values of the LPC coefficients, the prediction residue $u_n$ may be assumed spectrally white or virtually white. The result of filtering S(z) by means of the filter A(z) being U(z), the filter A(z) also is called a whitening filter. These fitter coefficients are conventional per se (for instance using the Levinson-Durbin algorithm).

Thereupon the spectral shape is modeled by:

$$\hat{S}(w) = \frac{G^2}{\rho(0) + 2\sum_{w}^{P} \rho(i)\cos(wi)}$$

with the following convention:

$$\rho(i) = \sum_{i=1}^{P-1} a_k a_{k-i};\ a_0 = 1;\ 0 \le i \le P.$$

The coefficients $a_k$ may be evaluated directly by LPC-analyzing the limited spectrum of the signal $S_B$ or else on the basis of external information (illustratively by a decoder in the manner described below). This implementing mode is illustrated by the dashed lines 230.

Again the coefficients $a_k$ may be evaluated by LPC analyzing the original full signal frequency band. This shall be the case for instance if the signal $S_B$ is produced by frequency band limited encoding: the encoder may feed the LPC coefficients—directly or in their reduced and quantified form—to the enhancement apparatus, the values of the coefficients allowing to recover the spectral shape of the full frequency band spectrum. This implementing mode is shown by the dashed line 220.

The coefficients are determined on a time carrier which may be selected to better match the local signal stationary states. Accordingly in the case of a non-stationary signal, the portion of the signal which shall be analyzed is split into homogeneous frames with respect to the spectral content. This homogeneity may be measured directly using spectral analysis by measuring the distance between the spectra estimated on each of the sub-frames and then regrouping the filters of similar zones.

Obviously too the information describing the spectral envelope may be in a different form than the LPC coefficients, provided said information allow modeling the spectral envelope in the form of a filter. Conceivably this information may be available in the form of vectors of a spectral shapes dictionary: it suffices that then the coefficients of modeling filter may be inferred. The transfer function of the whitening filter is selected as being the inverse of the transfer function of the envelope modeling filter.

Whitening by the filter 201 may be carried in the time domain as well as in the frequency domain.

Again the spectral transposition module 203 may operate either in the frequency domain or in the time domain. Transposition may be a mere translation or a more complex operation. If the target frequency band (that is the frequency band of the signal $S_H$) is adjacent to the initial frequency band (of the signal $S_B$), advantageously a spectral inversion followed by translation shall be employed to avert any spectral discontinuity where the two frequency bands join.

Transposition is a trivial operation in the frequency domain and therefore is not described.

Transposition also may be carried out in the time domain. If it involves a mere translation, it may be carried out for instance by simply modulating a single sideband at the translation frequency while eliminating the lower sideband. If a spectral inversion with translation in an adjacent frequency band is involved, it may be implemented by modulating the single sideband at twice the junction frequency while eliminating the upper sideband.

Figure 3A:
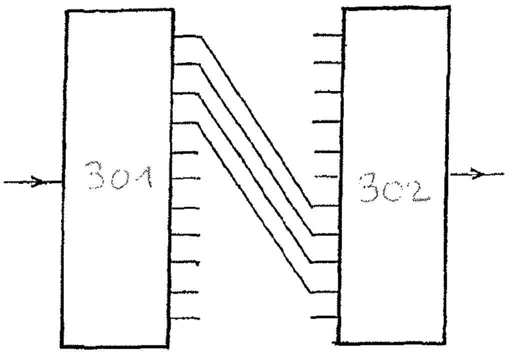
Figure 3B:
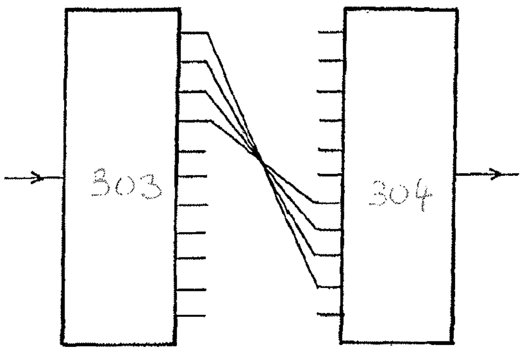

Transposition also may be carried out using a bank of analysis filters and a bank of synthesis filters (for instance a bank of polyphase filters) as shown in FIGS. 3*a* and 3*b*. Translation is carried out thanks to the connection of the outputs of analysis filter 301 to the inputs of translated ranks of the inputs of the synthesis filters 302 and the spectral inversion followed by translation thanks to the connection of the outputs of the analysis filters 303 to the inputs of the inversed orders which then are translated to the inputs of the synthesis filters 304.

Transposition may apply to all or part of the initial frequency band. Several transpositions within the target frequency band to different frequencies may be considered prior to the stage of spectral shaping. Also transposition may take place either after or before spectral whitening shall be conjugated with latter.

Following transposition in the target frequency band, the signal is shaped by a shaping filter 204. Several implementing modes are feasible.

In the first place, if the spectral enhancement apparatus receives information about a full frequency band spectral envelope (for instance in the case of a signal emitted by the limited frequency band encoding cited above), this information may be used to estimate the transfer function of the shaping filter. This shall be the case, for instance, if the LPC coefficients of the full frequency band signal are available. In that case the spectrum of the target frequency band shall assume the shape of the envelope with the frequency band under consideration. This implementing mode is shown by the dashed line 220.

Next the transfer function may be produced by extrapolating the initial frequency band's spectral envelope. Various extrapolating methods may be considered, in particular any procedure modeling the spectral envelope. In the particular case of the LPC coefficients having been estimated by the module 202 on the basis of the initial frequency band's spectral envelope, advantageously a shaping filter of which the coefficients are the LPC coefficients shall be used.

If transposition is conjugate with whitening, then whitening filtering and subsequent shaping may be carried out in a single operation by means of a transfer function which equals the product of the respective transfer functions of the whitening filter and of the shaping filter.

FIG. 4 illustrates the spectral enhancement method of one embodiment mode of the present invention. More specifically, it shows schematically the various signals $S_B$, $S_W$, $S_H$, $S_E$, $S_R$ for the particular case wherein the incomplete spectrum is restricted a low-frequency band and the target frequency band is the adjacent high-frequency band—this being the typical case of an audio application. Transposition is assumed subsequent to whitening.

Figure 4A:
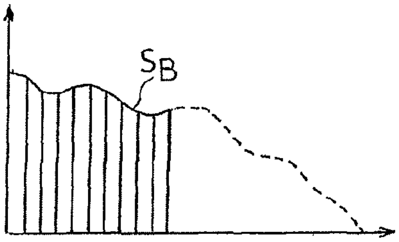

FIG. 4*a* shows the spectrum of the low-frequency signal $S_B$ as well as the spectral envelope of the full frequency band. It is either determined by extrapolating the envelope of the low frequency signal (dashed curve) or an external source of information provides the description of the full frequency band envelope.

Figure 4D:
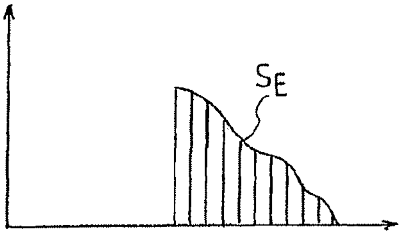
Figure 4B:
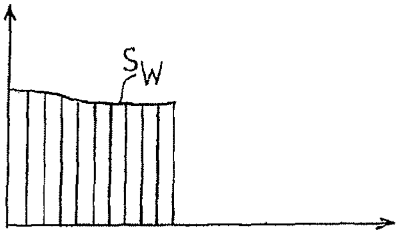
Figure 4E:
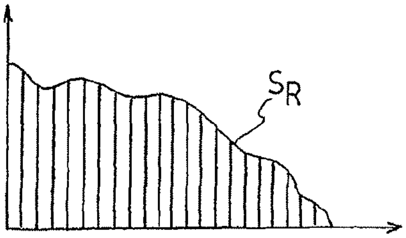
Figure 4C:
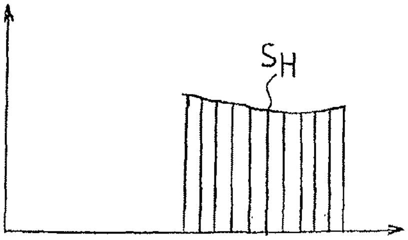
Figure 5:
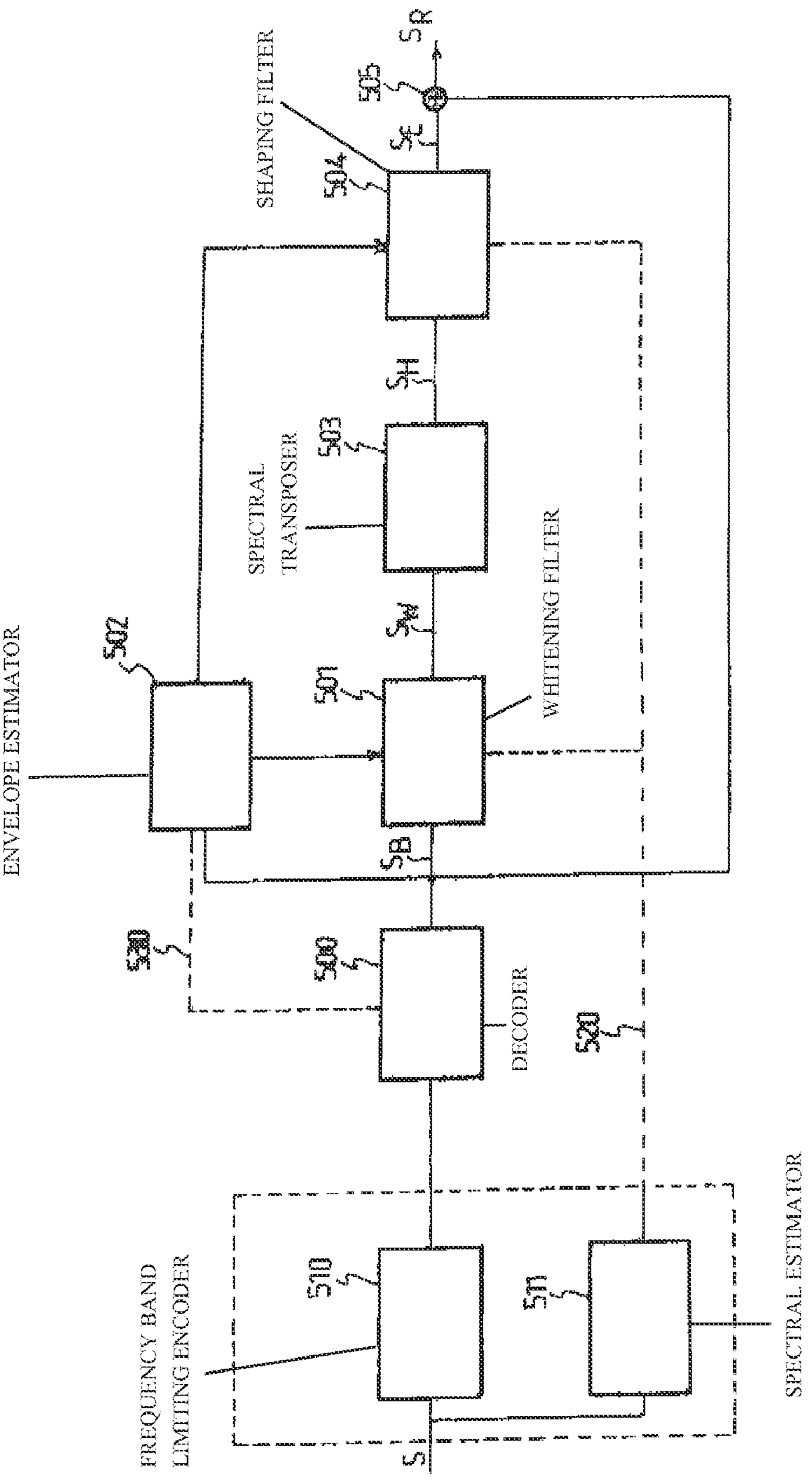
FIG. 5 is a schematic block diagram of a system comprising an encoder and decoder with the spectral enrichment apparatus of FIG. 2.

FIG. 4*b* shows the spectrum of the signal $S_w$ after spectral whitening,

FIG. 4*c* shows the spectrum of the signal $S_H$ following spectral whitening; the selected transposition being a simple translation, FIG. 4*d* shows the spectrum of the signal $S_E$ after spectral shaping, FIG. 4*e* shows the spectrum of the spectrally enhanced or reconstructed signal SR, FIG. 5 shows a system of the invention comprising a frequency band limiting encoder 510 as well as a decoder 500 associated with a spectral enhancement apparatus already described above.

Thanks to a spectral estimation module 511, the encoder may offer information describing the spectral envelope of the full frequency band signal. Alternatively it may offer information describing the signal's spectral envelope in one or several frequency bands that are to be shaped. Thereupon this information may be used directly by the spectrally shaping filter as already discussed above. Where called for, the encoder-transmitted information shall be used to correct the transfer function of the whitening filter in a way that the outcome of the whitening-transposition-shaping operation shall optimally reconstitute the spectral signal envelope prior to encoding. This embodiment mode is illustrated by the dashed line 520.

The decoder offers an incomplete or restricted spectrum signal which accepts spectral enhancement by the above described method. In this instance, rigorously speaking, spectral reconstruction is involved, a portion of the spectrum of the original signal source S having been cut off by encoding. In addition to the incomplete-spectrum decoded signal, the decoder also may by itself offer information relative to the spectral envelope of this signal which is exploitable by the envelope estimating module 502. This embodiment mode is shown by the dashed line 530. If the decoder only offers the incomplete-spectrum, decoded signal, the spectral envelope shall be estimated on the basis of the latter signal.

A representative application of the system of the invention is to spectrally reconstruct an audio signal encoded by a perceptive encoder. The audio encoder may be the rate-reducing transform kind (for instance MPEG1, MPEG2 or MPEG4-GA) or the type CELP (ITU G72X) or even parametric (parametric MPEG4 type).

For a given transmitted rate, the perceived sound quality shall be improved, the sound becoming "clearer". Alternatively the rate may be lowered at equivalent quality. The following is an illustrative configuration: transmitting an encoded signal at 24 kbit/s with addition of 2 kbit/s of high frequency spectral information, the quality of the 26 kbit/s signal so produced is equivalent to that of an approximately 64 kbit/s in the absence of the apparatus of the invention.

The applications of the invention are manifold and are not restricted to the spectral reconstruction of audio signals. The invention is able to reconstruct an arbitrary physical signal and in particular a speech signal.

Lastly and as already discussed above, the invention is not restricted to spectrally reconstructing an original, pre-extant signal but may be applied in general to spectral signal enhancement.

What is claimed is:

1. A method of enhancing spectral content of a decoded signal, the signal having an incomplete spectrum including a first spectral frequency band, said method comprising the following steps:

performing at least one translation of the spectral content of said first frequency band into a second frequency band excluded from said spectrum to generate a translated-spectrum signal, filtering the incomplete spectrum signal through a bank of analysis filters and applying output signals from said bank of analysis filters to inputs of translated ranks of inputs of a bank of synthesis filters to generate a translated-spectrum signal having a spectrum restricted to said second spectral frequency band;

shaping the spectrum of the translated-spectrum signal to produce an enhancement signal; and adding the enhancement signal to the incomplete spectrum signal to produce an enhanced-spectrum signal, the generation of the translated-spectrum signal including whitening said spectral content by applying a whitening filter to said first spectral frequency band so that the spectrum of the translated-spectrum signal is a whitened version of said spectral content.

2. Spectral content enhancement method as claimed in claim 1, wherein the second spectral band is adjacent to the first spectral band.

3. Spectral content enhancement method as claimed in claim 1, wherein whitening the spectral content is performed by filtering the incomplete spectrum signal through a whitening filter.

4. Spectral content enhancement method as claimed in claim 3, wherein a transfer function of the whitening filter is based on information indicative of a spectral envelope of the incomplete spectrum signal.

5. A method according to claim 4, wherein said information indicative of the spectral envelope of the incomplete-spectrum signal comprises LPC coefficients of the incomplete-spectrum signal.

6. Spectral content enhancement method as claimed in claim 4, further including adjusting the transfer function of the whitening filter as a function of information indicative of a spectral envelope of a complete spectrum version of the signal.

7. Spectral content enhancement method as claimed in claim 1, wherein the spectrum shaping is performed by filtering the translated-spectrum signal through a shaping filter.

8. Spectral content enhancement method as claimed in claim 7, wherein the shaping filter has a transfer function resulting from an extrapolation of the spectral envelope of the incomplete-spectrum signal.

9. Spectral content enhancement method as claimed in claim 7, wherein the shaping filter has a transfer function is based on information indicative of a spectral envelope of a complete spectrum version of the signal.

10. Spectral content enhancement method as claimed in claim 9, wherein whitening said spectral content is performed by using a whitening filter having a transfer function, said transfer function being corrected based on said information indicative of the spectral envelope of the complete version of the spectrum signal.

11. The method of claim 1, wherein the incomplete spectrum signal is a limited band audio signal.

12. A method of improving decoding of an incomplete spectrum signal, said incomplete spectrum signal having been produced by encoding in a spectrum limiting manner a wide frequency band source Signal, comprising enhancing the decoded signal by the spectral enhancement method of claim 1.

13. The method of claim 12, wherein the encoding comprises perceptive encoding.

14. A method of improving decoding of an incomplete spectrum signal, said incomplete spectrum signal having been produced by a step of encoding in a spectrum limiting manner a wide frequency band source signal, comprising enhancing the decoded signal by using the spectral enhancement method claimed in claim 4, wherein the step of encoding produces the information indicative of the spectral envelope of the incomplete spectrum signal.

15. A method for improving decoding of an incomplete spectrum signal, the incomplete spectrum signal having been produced by encoding in a spectrum limiting manner a wide frequency band source signal, the encoding providing information indicative of the spectral envelope of the wide frequency band source signal, the improvement comprising enhancing the decoded signal by the spectral enhancement method claimed in claim 8, wherein the extrapolated version of the spectral envelope of the incomplete spectrum signal corresponds to the wide frequency band source signal.

16. An encoding/decoding apparatus comprising a frequency band limiting encoder adapted to receive a source signal and produce an encoded signal, a spectrum estimating device for providing spectral envelope information representative of a spectral envelope of the source signal, a decoder for decoding the encoded signal into a decoded signal, and an arrangement for performing the steps of claim 1.

17. A method of improving decoding of an incomplete spectrum signal, said incomplete spectrum signal having been produced by encoding in a spectrum limiting manner a wide frequency band source signal, comprising enhancing the decoded signal having an incomplete spectrum which include a first spectral frequency band having an envelope by:

performing at least one translation of the spectral content of said first frequency band into a second frequency band excluded from said spectrum to generate a translated-spectrum signal, filtering the incomplete spectrum signal through a bank of analysis filters and applying output signals from said bank of analysis filters to inputs of translated ranks of inputs of a bank of synthesis filters to generate a translated-spectrum signal having a spectrum restricted to said second spectral frequency band;

shaping the spectrum of the translated-spectrum signal to produce an enhancement signal; and adding the enhancement signal to the incomplete spectrum signal to produce an enhanced-spectrum signal, the generation of the translated-spectrum signal including whitening said spectral content by applying a whitening filter to said first spectral frequency band so that the spectrum of the translated-spectrum signal is a whitened version of said spectral content.

18. A method according to claim 17, wherein the generation of the translated-spectrum signal includes whitening said spectral content by filtering said spectral content through a whitening filter having a transfer function which is approximately inverse of an envelope function of the first spectral frequency band of the incomplete spectrum signal so the spectrum of the translated-spectrum signal is a whitened version of said spectral content.

19. A method according to claim 18, wherein said transfer function is based on information indicative of the spectral envelope of the incomplete-spectrum signal comprising LPC coefficients of the incomplete-spectrum signal.

20. A device for enhancing spectral content of a decoded signal, the signal having an incomplete spectrum including a first spectral frequency band having an envelope, said device comprising:

a generator adapted to apply at least one translation of the spectral content of said first frequency band into a second frequency band excluded from said spectrum, by filtering the incomplete spectrum signal through a bank of analysis filters and applying output signals from said bank of analysis filters to inputs of translated ranks of inputs of a bank of synthesis filters to generate a translated-spectrum signal having a spectrum restricted to said second spectral frequency band, said generator being adapted to whiten said spectral content to generate a translated-spectrum signal;

shaping means for shaping the spectrum of the translated-spectrum signal to produce an enhancement signal; and an adder adapted to add the enhancement signal to the incomplete spectrum signal to produce an enhanced-spectrum signal, wherein the generator is configured to apply a whitening filter to said first spectral frequency band so that the spectrum of the translated-spectrum signal is a whitened version of said spectral content.

21. A method of enhancing spectral content of a decoded signal, the signal having an incomplete spectrum including a first spectral frequency band, said method comprising the following steps:

performing at least one translation of the spectral content of said first frequency band into a second frequency band excluded from said spectrum to generate a translated-spectrum signal, filtering the incomplete spectrum signal through a bank of analysis filters and applying output signals from said bank of analysis filters to inputs of translated ranks of inputs of a bank of synthesis filters to generate a translated-spectrum signal having a spectrum restricted to said second spectral frequency band;

shaping the spectrum of the translated-spectrum signal to produce an enhancement signal; and adding the enhancement signal to the incomplete spectrum signal to produce an enhanced-spectrum signal, the generation of the translated-spectrum signal including whitening said spectral content by filtering said spectral content through a whitening filter having a transfer function which is approximately inverse of an envelope function of the first spectral frequency band of the incomplete spectrum signal so that the spectrum of the translated-spectrum signal is a whitened version of said spectral content.

* * * * *